United States Patent
Ortner et al.

(10) Patent No.: US 9,357,879 B2
(45) Date of Patent: Jun. 7, 2016

(54) GRIDDLE

(71) Applicant: Viking Range, LLC, Greenwood, MS (US)

(72) Inventors: Matthew L. Ortner, Greenwood, MS (US); Michael C. Milner, Greenwood, MS (US)

(73) Assignee: Viking Range, LLC, Greenwood, MS (US)

( * ) Notice: Subject to any disclaimer, the term of this patent is extended or adjusted under 35 U.S.C. 154(b) by 0 days.

(21) Appl. No.: 14/479,839

(22) Filed: Sep. 8, 2014

(65) Prior Publication Data

US 2015/0335199 A1   Nov. 26, 2015

Related U.S. Application Data

(63) Continuation-in-part of application No. 14/286,514, filed on May 23, 2014.

(51) Int. Cl.
| | |
|---|---|
| *A47J 37/10* | (2006.01) |
| *A47J 27/00* | (2006.01) |
| *A47J 37/06* | (2006.01) |

(52) U.S. Cl.
CPC ............ *A47J 37/067* (2013.01); *A47J 37/0676* (2013.01)

(58) Field of Classification Search
CPC ................................. A47J 37/10; A47J 37/067
USPC ........... 99/372, 375, 400, 422, 425, 444, 445, 99/446
See application file for complete search history.

(56) References Cited

U.S. PATENT DOCUMENTS

| | | | |
|---|---|---|---|
| 2,012,520 A * | 8/1935 | Rogers | 99/425 |
| 3,880,064 A * | 4/1975 | Martinez | 99/349 |
| 3,994,211 A | 11/1976 | Stanek | |
| 4,245,147 A | 1/1981 | Cummings et al. | |
| 4,512,250 A * | 4/1985 | Schindler et al. | 99/425 |
| 4,598,634 A * | 7/1986 | Van Horn, II | 99/340 |
| 4,608,917 A * | 9/1986 | Faaborg | 99/340 |
| 4,633,772 A | 1/1987 | Bowden et al. | |
| 4,895,131 A | 1/1990 | Overholser | |
| 5,413,032 A | 5/1995 | Bruno et al. | |
| 5,676,043 A | 10/1997 | Best | |
| 5,678,531 A | 10/1997 | Byers et al. | |
| 7,647,866 B2 | 1/2010 | Button | |
| 8,074,563 B2 | 12/2011 | Bowles et al. | |
| 8,757,052 B2 | 6/2014 | Hess et al. | |
| 8,997,635 B2 * | 4/2015 | Buzick et al. | 99/389 |
| 2005/0039609 A1 * | 2/2005 | Scharbo | A23L 1/0121 99/419 |
| 2010/0154655 A1 * | 6/2010 | Mehta et al. | 99/425 |
| 2012/0085242 A1 * | 4/2012 | Lam | 99/323.7 |
| 2012/0097046 A1 * | 4/2012 | Jones | A47J 37/0629 99/334 |

* cited by examiner

*Primary Examiner* — Dana Ross
*Assistant Examiner* — Lindsey C Teaters
(74) *Attorney, Agent, or Firm* — Baker Donelson

(57) ABSTRACT

A griddle (10) is disclosed which includes a base (11) and a griddle plate (13). The base includes a frame (15) and a removable grease trough (16). The frame includes sidewalls (18) with top surface (22) having a grease collection channel (23) with a capture hole (24) located so that liquids within the grease collection channel flow through the grease capture hole and into the grease trough. The base has a grease trough well (26) configured to receive the grease trough therein. The grease trough includes a trough collection catch (28) with a sump (32), a handle base (29), and a thermally insulative handle or handle insert (30). The griddle plate has a top surface (38) and a stepped bottom surface (39) defined by a peripheral side edge (40). The stepped bottom surface includes a groove (44) which forms a drip edge (45) positioned above the grease collection channel.

11 Claims, 4 Drawing Sheets

GRIDDLE

REFERENCE TO RELATED APPLICATION

This is a continuation-in-part of U.S. patent application Ser. No. 14/286,514 filed May 23, 2014.

TECHNICAL FIELD

This invention relates generally to griddles, and more particularly to the handle portion of griddles.

BACKGROUND OF THE INVENTION

Griddles used for cooking food have existed for many years. These cooking griddles typically include a generally flat cooking surface which is positioned above a gas burner or heating element incorporated into the griddle or separate and apart from the griddle such as in a cooktop. The cooking surface may be elevated above a peripheral channel which collects any food juices, such as grease, coming from the cooked food.

A problem with these types of griddles has been the disposal of the collected food juices once the cooking process is completed. Oftentimes, the entire cooking surface must be carefully removed, transported and then tilted to pour the captured food juices from the peripheral trough. This task can be difficult due to the temperature of the griddle handle and the large area of the cooking surface to negotiate during its movement and pouring process.

Accordingly, there is a need in the art for a griddle from which it will be easier to capture and later expel the captured food juices. It is to the provision of such therefore that the present invention is primarily directed.

SUMMARY OF THE INVENTION

In a preferred form of the invention a griddle comprises a base having a cooking area and a trough well, and a collection catch removably mounted within the base trough well. The collection catch has a collection sump and a thermally insulative handle having a gripping portion positioned at least partially over the collection sump.

DETAILED DESCRIPTION

Figure 1:
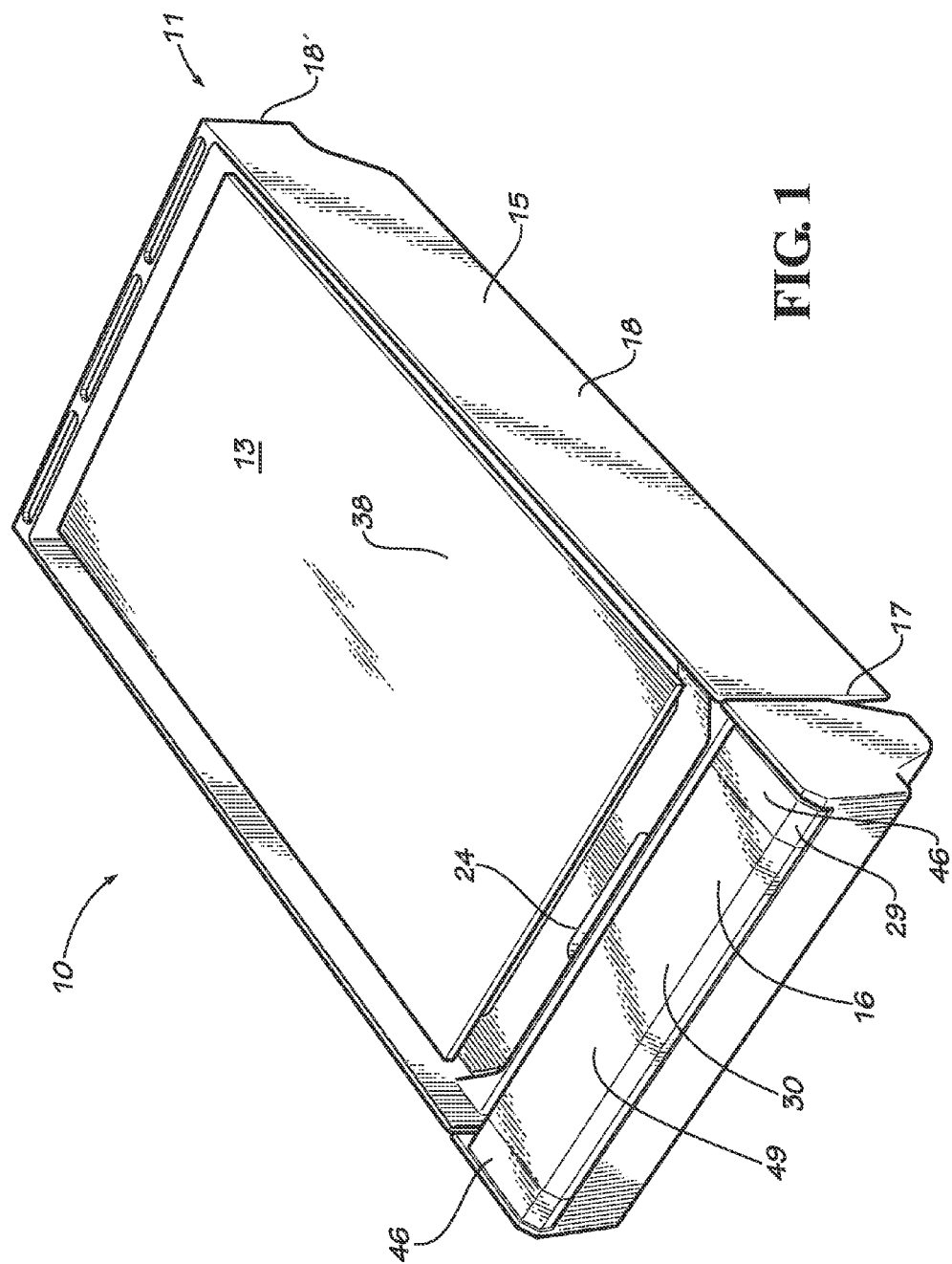
FIG. 1 is a perspective view of the griddle embodying principles of the invention in a preferred form.
Figure 2:
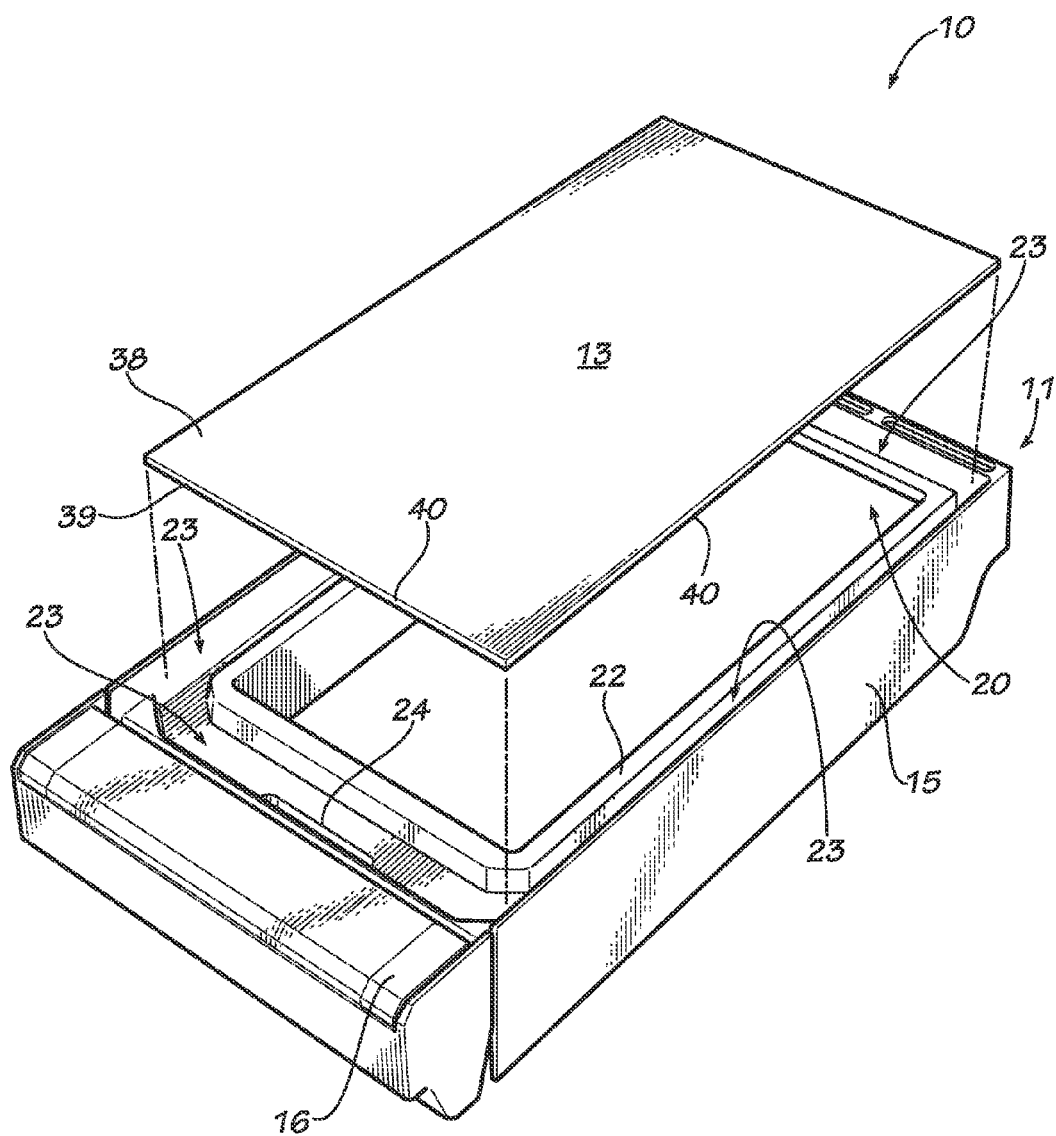
FIG. 2 is an exploded, perspective view of the griddle of FIG. 1, shown with a griddle plate removed from a base.

With reference next to the drawings, there is shown a griddle 10 according to the present invention. The griddle 10 includes a peripheral base 11, made of a metal such as aluminum. The griddle 10 also includes a cooking area or griddle plate 13 removably mounted to the base 11.

The base 11 includes a peripheral frame 15 and a grease trough or drip tray 16 removably mounted to a front end 17 of the frame 15. The frame 15 includes four peripheral sidewalls 18 which form a bottom recess 19 extending to a top opening 20. The rear sidewall 18' opposite the front end 17 preferably has a shorter overall height than the other three sidewalls so that the heat captured within the bottom recess 19 escapes below the rear sidewall 18' and away from the user. The frame 15 also has a top surface 22 which includes a downwardly extending peripheral grease collection channel 23. The term grease as used herein is intended to encompass all types of food juices produced while cooking them. The grease collection channel 23 is sloped or tilted downwardly towards a grease exit port or capture hole 24 located adjacent the grease trough 16, so that liquids contained within the grease collection channel 23 flow towards and through the grease capture hole 24. The front end 17 of the base 11 has a generally L-shaped grease trough receptacle or well 26 which is configured to receive the grease trough 16 therein. The grease trough well 26 may be removably mounted to the rest of the frame to enable it to be separated for better cleaning.

Figure 3:
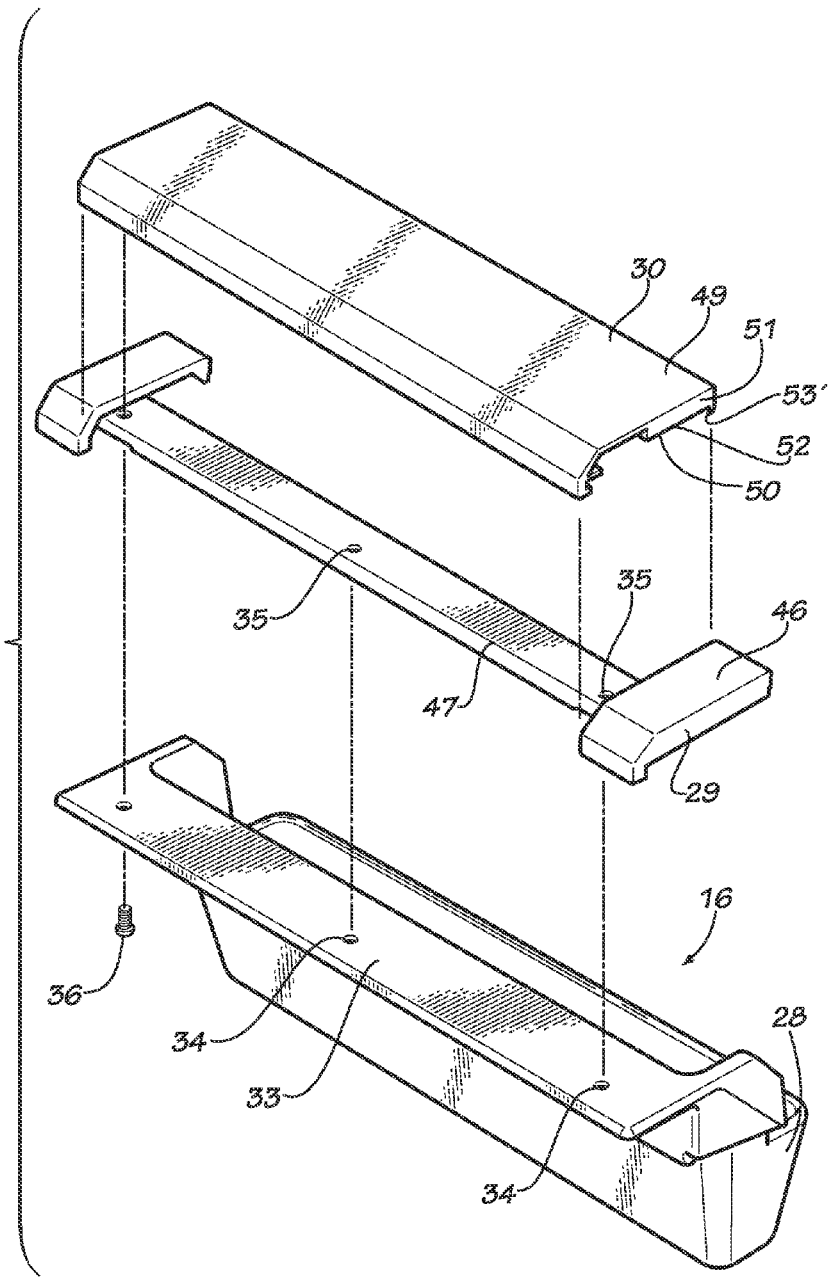
FIG. 3 is an exploded, perspective view of a grease trough of the griddle of FIG. 1.

The grease trough 16 includes a trough collection catch 28, a handle base 29, and a thermally insulative handle or handle insert 30, as best shown in FIG. 3. The grease trough collection catch 28 has a lower collection sump 32 extending from an upper, handle flange 33 having three mounting screw holes 34 therethrough. The trough collection catch 28 and handle base 29 are made of a metal such as aluminum.

The handle base 29 has two oppositely disposed ends 46 and a generally flat span 47 bridging the ends 46. The span 47 has three mounting holes 35 that align with screw holes 34.

The handle insert 30 has a top surface 49 and an opposite bottom surface 50. The handle insert 30 has a large overhanging portion or gripping portion 51 which includes an an upwardly extending recess 52 extending from the bottom surface 50 which is defined by sidewalls 53 on all four sides. The rearward most sidewall 53' form a lip which aids in preventing an operator's fingers from sliding off the gripping portion and hitting the hot cooking area when in use. The handle insert 30 also includes three threaded screw mounting holes 54 therein. The gripping portion 51 overhangs a portion of the sump 32. The handle insert 30 is made of a thermally insulative, heat resistant plastic or the like. Alternatively, the handle insert 30 may be snap-fitted onto the handle base 29 with mounting screws 36 only passing through screw holes 34 and 35.

The trough collection catch handle flange 33 three mounting screw holes 34 are aligned with mounting screw holes 35 within the handle base 29 and threaded mounting screw holes 54 within the handle insert 30. Mounting screws 36 pass through screw holes 34, 35 and 54 and thereby couple the handle insert 30 and handle base 29 to the trough collection catch 28.

Figure 4:
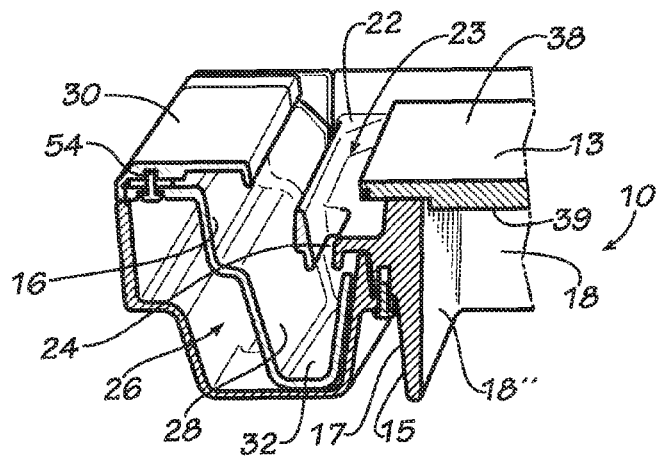
FIGS. 4-6 are a series of cross-sectional view of a portion of the griddle of FIG. 1.
Figure 5:
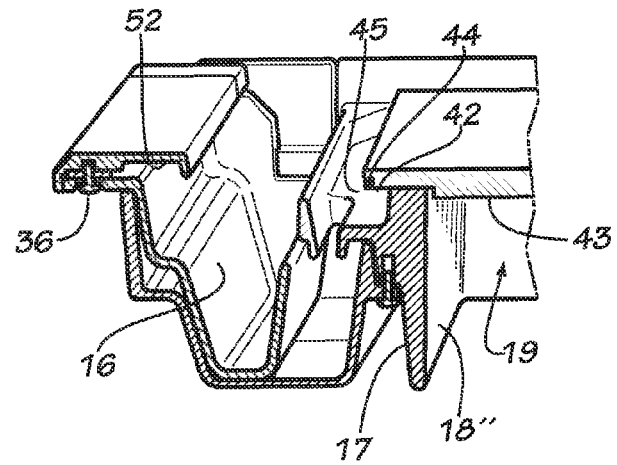
Figure 6:
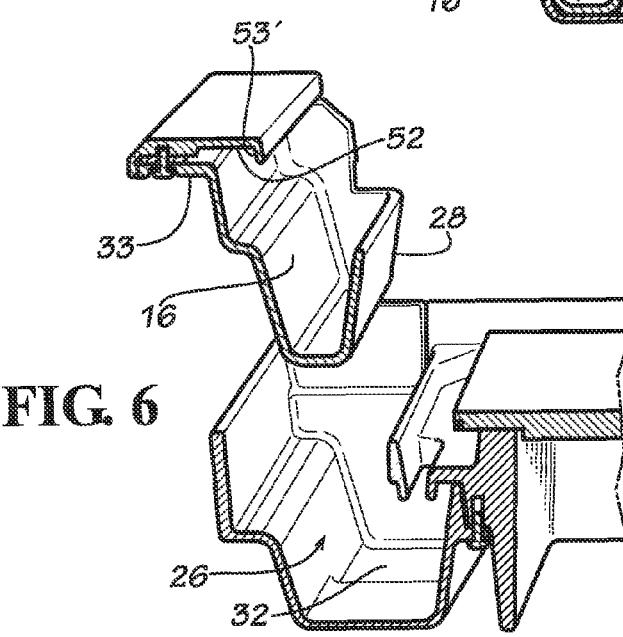

The grease trough 16 is configured to be movable within the grease trough well 26 between a first, in-use position, shown in FIG. 4, a second, disengaged position, shown in FIG. 5, and a third, removed position, as shown in FIG. 6. The handle insert 30 extends over the collection sump 32 to provide a grip or gripping area for the user. With the grease trough 16 in its in-use position, the collection sump 32 is positioned below the grease capture hole 24 so that food juices passing through the grease capture hole 24 are deposited into the underlying collection sump 32. Additionally, while in the in-use position the handle insert 30 abuts the front sidewall 18" so as to cover the exposed or open top area of the underlying trough catch to prevent direct access to the grease captured therein and prevent the splattering of grease from the grease trough onto the user and the surrounding area, as best shown in FIG. 1 wherein the handle insert is depicted substantially flush with or abutting the front wall and the remaining portions of the grease trough 16 are obscured from view by the handle insert.

The griddle plate 13 is generally planar with a top surface 38 and a stepped bottom surface 39 defined by a peripheral side edge 40. Both the top surface and the bottom surface may be a cooking surface with different surface configurations, depending upon which surface is facing upwardly during the cooking process. The stepped bottom surface 39 includes a peripheral margin area 42 and a thicker central area 43. The margin area 42 includes an upwardly extending groove 44 which forms, in combination with the peripheral side edge 40, a peripheral drip lip or edge 45. The drip edge 45 is positioned directly above the grease collection channel 23. The griddle plate central area 43 is configured to be received or nested within the top opening 20, which aids in maintaining the position of the griddle plate 13 relative to the underlying base 11. The griddle plate 13 is preferably made of a high thermally conductive metal, such as a chrome plated stainless steel.

In use, the griddle 10 is positioned over the heat source, such as a gas burner, of a cooktop. Preferably, the griddle 10 is positioned over the gas burner with the normal or customary burner grates removed, i.e., the griddle replaces the burner grates and does not rest upon them. The griddle sidewalls 18 act to trap the majority of the heat within the bottom recess 19 so that an even heat is applied to the overlaying griddle plate 13.

As food is cooked upon the griddle plate 13, grease and/or other types of food juices flow over the top surface 38 of the griddle plate 13. As these juices reach the peripheral side edge 40 of the griddle plate, the juices flow downwardly along the side edge 40 and upon reaching the margin bottom surface 39 the juices drip or drop into the underlying grease collection channel 23. If the juice somewhat adheres to the margin bottom surface 39 the peripheral groove 44 or undercut described hereinafter, prevents further travel or flow along the bottom surface and thereby causes the juices to drop or drip, i.e., the groove 44 forms the drip edge 45 which prevents juices from flowing along the bottom surface 39 of the griddle plate 13.

As the juice drop into the grease collection channel 23 it gravitationally flows through the sloped grease collection channel 23 towards the lower positioned grease capture hole 24. The juice then flows through the grease capture hole 24 and drops into the underlying collection sump 32 of the grease trough 16.

Once the food has completed cooking and the user wishes to remove the juice from the grease trough, the grease trough 16 is simply moved or slid from its collection position, shown in FIG. 4, to a disengaged position, shown in FIG. 5. This is accomplished by moving the grease trough 16 toward the frame front end 17 by pulling or pushing upon the handle insert 30 in this direction. The user then grasps the handle insert 30 and lifts the grease trough 16 from the grease trough well 26 to its completely removed position separate and apart from the base 11, as shown in FIG. 6. The juice within the grease trough collection sump 32 may then be poured out of the collection sump and properly disposed.

The thermally insulative characteristics of the handle insert 30 allows the grease trough 16 to be handled immediately after the cooking process is complete, as heat is restricted from being transferred from the grease trough to the user's hands. This is a vast improvement over prior art griddles that utilize metal handles which get hot with the use of the griddle, making them difficult to grasp and handle. This ability to handle the grease trough while still hot allows for better clean-up and disposal of juices, such as grease, as such juices flow better while at a high temperature. The bottom recess 52 within the handle insert 30 insures that a person's fingers will not move too close to and encounter the possibly hot portions of the griddle, i.e., the recess helps to maintains the fingers upon the handle insert. The front sidewall 53' of the recess aids in preventing the fingers from slipping off the rearward end of the handle insert, especially when lifting the grease trough.

Figure 7:
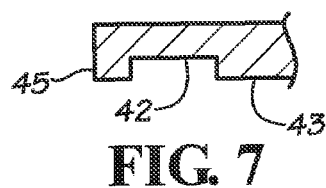
FIG. 7 is a cross-sectional side view of a portion of a griddle plate in another preferred form of the invention.

It should be understood that as an alternative to the groove 44, a portion of the griddle plate spaced from the side edge 40 may be undercut so that the side edge 40 depends lower than the undercut portion to form the downwardly extending drip lip, as shown in FIG. 7.

It should be understood that even though the description herein primarily refers to a gas burner, any alternative heat form may also be utilized, such as charcoal, electric heating elements, and other conventionally known heating means.

It should be understood that as an alternative to the use of the griddle atop an existing burner, a heat source may be incorporated into the griddle so that it is a stand alone structure.

Last, it should be understood that the removable feature of the griddle plate, while desirable to enable different types of griddle plates to be used and switched at any time, is not mandatory to the invention. However, the removable feature is also desirous as this allows for the use of multiple griddle plates of different surface configurations to be used.

While this invention has been described in detail with particular reference to the preferred embodiments thereof and the best mode of practicing same, it will be understood that variations and modifications can be effected within the spirit and scope of the invention as described herein above and as set forth in the appended claims.

The invention claimed is:

1. A griddle comprising:
   a base having a cooking area and a trough well, said base trough well includes a handle flange, and
   a collection catch removably mounted within said base trough well, said collection catch having a collection sump and a thermally insulative handle having a laterally extending gripping portion positioned laterally at least partially over said collection sump, and wherein said thermally insulative handle includes a handle base coupled to said handle flange and a thermally insulative handle insert coupled to said handle base span which includes said gripping portion, said handle base includes two end portions and a span bridging said end portions, said thermally insulative handle insert is coupled to said handle base span through a plurality of mounting screws which do not extend through a top surface of said thermally insulative handle insert.

2. The griddle of claim 1 wherein said gripping portion has a top surface and a bottom surface, and wherein said bottom surface includes a recess extending upwardly towards said top surface.

3. The griddle of claim 1 wherein said gripping portion has a top surface and a bottom surface, and wherein said bottom surface includes downwardly extending lip positioned along the rearward edge of said gripping portion, whereby the lip aids in preventing an operator's fingers from sliding off the gripping portion.

4. A griddle comprising:
   a base having a cooking area, a collection channel directly adjacent said cooking area and having a capture hole therethrough, and a trough well having a portion extending below said collection channel, and a collection catch having a collection sump and a handle having a thermally insulative gripping portion, said collection catch being movable between a first position within said trough well wherein said collection sump is positioned directly below said collection channel capture hole, a second position within said trough well wherein said collection sump is not positioned directly below said collection channel, and a third position completely removed from said trough well.

5. The griddle of claim 4 wherein said gripping portion is positioned over at least a portion of said collection sump.

6. The griddle of claim 4 wherein said gripping portion has a top surface and a bottom surface, and wherein said bottom surface includes a recess extending upwardly towards said top surface.

7. The griddle of claim 4 wherein said base trough well includes a handle flange, and wherein said handle includes a handle base coupled to said handle flange and a thermally insulative handle insert which includes said gripping portion.

8. The griddle of claim 7 wherein said handle base includes two end portions and a span bridging said end portions.

9. The griddle of claim 8 wherein said thermally insulative handle insert is coupled to said handle base span.

10. The griddle of claim 9 wherein said thermally insulative handle insert is coupled to said handle base span through a plurality of mounting screws which do not extend through said top surface of said thermally insulative handle insert.

11. The griddle of claim 4 wherein said gripping portion has a top surface and a bottom surface, and wherein said bottom surface includes downwardly extending lip positioned along the rearward edge of said gripping portion, whereby the lip aids in preventing an operator's fingers from sliding off the gripping portion.

* * * * *